Figure 1:
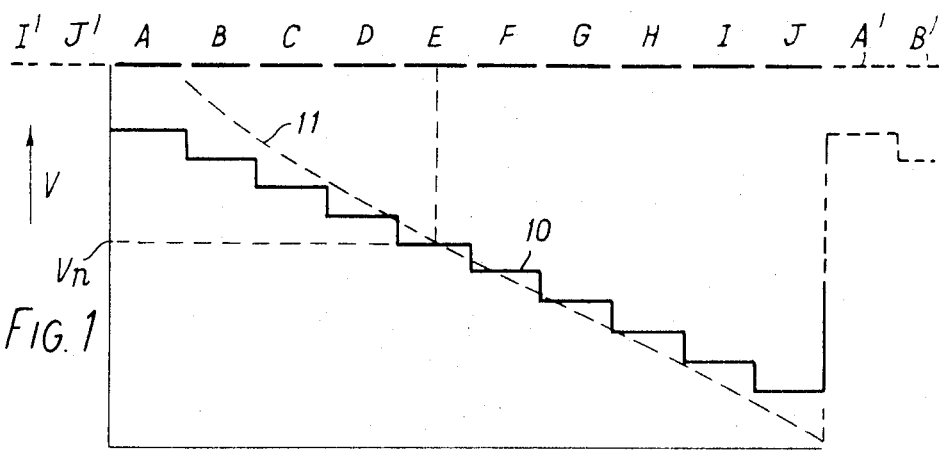

United States Patent [19]
Jeffries

[11] 3,788,234
[45] Jan. 29, 1974

[54] VEHICLE-CONTROL APPARATUS

[75] Inventor: Thomas Oliver Jeffries, Uxbridge, England

[73] Assignee: Brunel University, Uxbridge, England

[22] Filed: Mar. 28, 1972

[21] Appl. No.: 242,877

[30] Foreign Application Priority Data
Mar. 30, 1971 Great Britain.................... 8,246/71

[52] U.S. Cl. ............................ 104/152, 246/187 B
[51] Int. Cl............................................. B60l 15/04
[58] Field of Search........ 104/148 R, 149, 152, 155; 246/182 C, 187 B

[56] References Cited
UNITED STATES PATENTS
3,687,082  8/1972  Burke, Jr. ........................... 104/152
3,263,625  8/1966  Midis et al. ................. 104/148 R X
3,661,092  5/1972  Morley et al................... 104/148 R
3,318,262  5/1967  Ganzinotti ......................... 104/155

Primary Examiner—Gerald M. Forlenza
Assistant Examiner—George H. Libman
Attorney, Agent, or Firm—William R. Woodward

[57] ABSTRACT

In a transport system the movement of vehicles is controlled by a control wave travelling along a vehicle track. The vehicle has a pick-up device for picking up the travelling wave, and driving means responsive to the control wave and causing, or tending to cause, the vehicle to move along the track in register with, and hence at the same speed as, a predetermined region of the wave.

7 Claims, 4 Drawing Figures

VEHICLE-CONTROL APPARATUS

The present invention relates to apparatus for controlling the movement of vehicles in a transport system and is concerned particularly, but not exclusively, with the control of electric vehicles on railway tracks.

The demands for the transport of both passengers and goods continue to increase. With the present methods of control, the density of rail traffic has, in some systems, reached a level which it would be unsafe to exceed. Nevertheless, the amount of railway track directly occupied by rolling stock at any instant is a small fraction of the total track in the system.

Thus there is a requirement for improved apparatus for controlling the movement of vehicles in a transport system whereby the traffic density could safely be increased and hence more efficient use could be made of the track in the system.

It is one object of the present invention to provide improved apparatus for controlling the movement of vehicles in a transport system whereby the aforesaid requirement can be met.

It is another object of the present invention to provide improved apparatus for controlling the movement of vehicles in a transport system whereby the position at any instant of a vehicle in the system can readily be indicated.

It is a further object of the invention to provide improved apparatus for controlling the movement of vehicles in a transport system whereby routing of vehicles across a complex network of tracks can be facilitated with optimum timing of the entry of vehicles at junctions and the crossing of vehicles at track crossings.

It is yet another object of the invention to provide improved apparatus for controlling the movement of vehicles in a transport system whereby the use of a computer for determining routes and timing of movements of vehicles for optimum utilisation of the system can be facilitated.

According to the present invention, apparatus for controlling the movement of vehicles in a transport system comprises means for providing a controlling wave travelling along a vehicle-track at a predetermined speed, and, in each vehicle, driving means are provided which respond to the controlling wave in such a manner that the vehicle tends to move along the track in register with a predetermined region of the travelling wave. Thus the speed of the travelling wave is arranged to be the speed at which the vehicles are to move along the track and when several vehicles are moved onto the same track and closely adjacent one another they will bunch into contact with one another and continue along the track in a bunch which is centred on the said predetermined region of the travelling control wave. Along a given length of track there will be several cycles of the travelling wave and hence vehicles can be in several bunches, respectively centred on corresponding regions of different cycles of the travelling wave. If a bunch of vehicles reaches an incline and tends to slip relative to the travelling control wave, more or less power, as appropriate, will be applied by the driving means of the vehicle to tend to maintain the bunch centred on the said predetermined region of the cycle of the controlling wave for that bunch.

It will be appreciated that each vehicle, or bunch of vehicles, is, as it were, trapped in the cycle of the controlling wave appropriate to it whereby the number of vehicles using a given length of track at any instant can be increased.

It will also be appreciated that by appropriate phasing and/or wave-shaping of the controlling waves on two different tracks which join together at a junction, the feeding of vehicles from the two separate tracks onto a common track at the junction can be facilitated.

Because a vehicle is trapped in one cycle of the travelling control wave associated with a track, the position of the vehicle along the track at any instant is given by the position of that cycle of the wave. By allocating identifying codes to vehicles and to the cycles of the controlling wave and feeding these codes to a computer in accordance with the mating of vehicles with different cycles of the wave, the position of all vehicles throughout the system can be displayed instant by instant.

The frequency of the different controlling waves in different parts of the system will be the same but the wavelength and hence the speed to movement of the wqve can be varied to suit varying requirements in different parts of the system. For example, different routes of the same length can contain different numbers of wavelengths whereby in determining a route for a vehicle across a complex network of tracks, sections of different speeds can be selected to facilitate smooth merging of vehicles at junctions and appropriate separation at crossings.

In using a computer for selecting the optimum route for the movement of a vehicle across a complex network the simplest mode of operation would be one in which the vehicle does not leave the starting terminal until an open route to the finishing terminal has been found by the computer.

In more complex modes of operation queuing may be permitted on the approaches to junctions and crossings and such operation may be on a determinate or statistical basis.

The control wave may be provided in various ways. For example, the travelling control wave may be electric and may itself provide the power for electric driving means on the vehicle. Alternatively the driving means may be powered from a separate source which may or may not be electric. In this event the controlling wave is separately supplied and is picked up separately for use in controlling the vehicle. With such a separate wave a speed controller is required for the driving means in which the signal received from the controlling wave is compared with a reference signal as in a servo-loop and the positive or negative output of the comparator is applied to the driving means and speeds up or slows down the vehicle as appropriate.

It is also envisaged that the control wave could be in the form of a mechanical travelling wave as of a steel strip in a trough between the two rails of a railway track. The pick-up device on the vehicle could, for example, then be an arm or pneumatic device sensing the height of the steel strip immediately below the pick-up.

Figure 2:
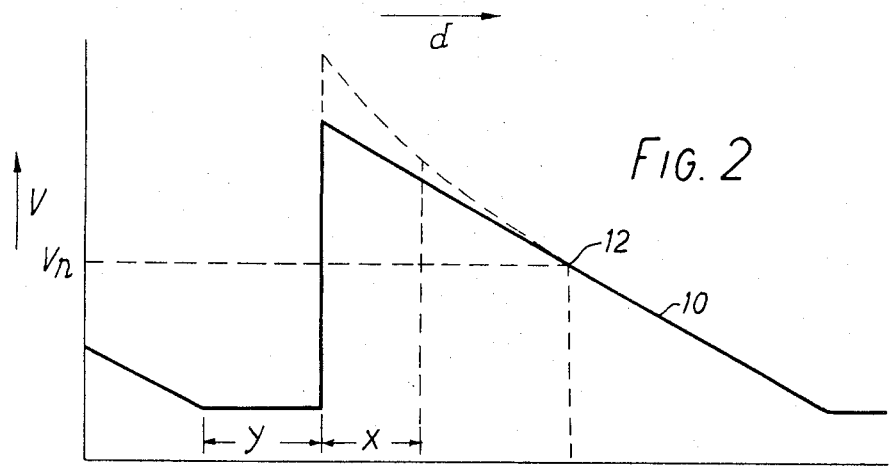
Figure 3:
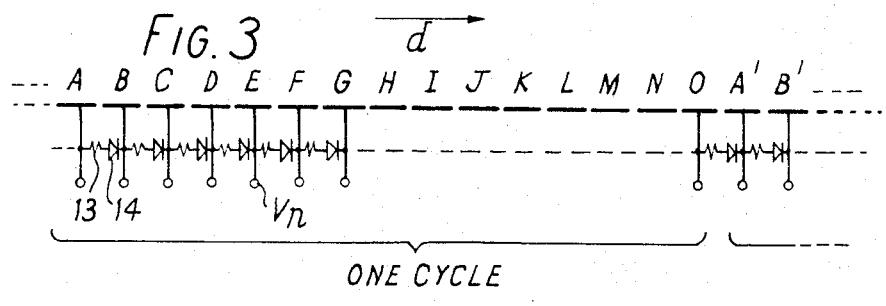
Figure 4:
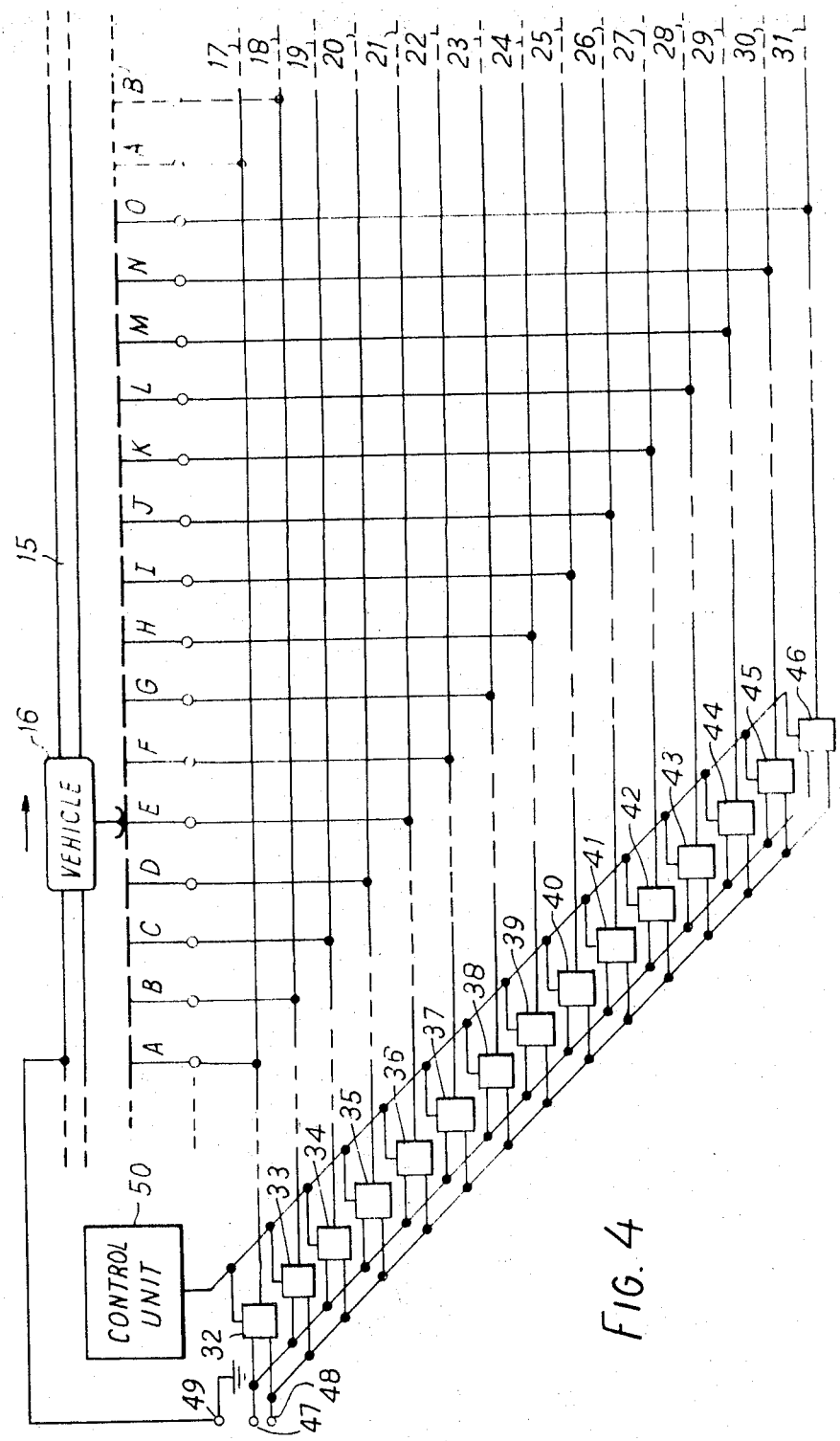

The invention will now be described, by way of example, with reference to the accompanying drawings, in which FIG. 1 is an explanatory diagram showing the fundamental principle underlying the invention in one form, FIG. 2 is an explanatory diagram showing the manner in which vehicles can be fed from one track onto another at a junction, FIG. 3 is an explanatory diagram showing the mode of operation in one embodiment of the invention, and FIG. 4 is a block diagram of the embodiment.

Referring to FIG. 1, assume that the speed control of an electrically driven vehicle is effected by a controlling wave which also acts as the source of electric energy for driving the vehicle.

The driving motor of the vehicle is assumed to provide a nominal design speed of the vehcle in response to a predetermined supply voltage of $V_n$ volts. A voltage of more than $V_n$ causes the vehicle to run at a speed higher than the design speed and a voltage lower than $V_n$ causes the vehicle to run at a speed lower than the design speed.

Take now the vehicle moving along its track and being supplied with electric energy from a supply rail which is discontinuous as shown by the sections marked A-J in FIG. 1. Suppose now that at a given instant the voltages applied to the sections A-J are as shown in the graph 10 of FIG. 1. This is a graph of a staircase waveform in which voltage V is plotted against distance $d$ along the track. Thus at the instant shown the section A is at a maximum supply voltage and the sections B-J are at progressively lower supply voltages. The supply voltage corresponding to the nominal supply voltage $V_n$ for the rated design speed of the vehicle is also shown and at that instant is applied to the section E.

Now consider that by appropriate switching the wave of FIG. 1 is caused to move to the right at a required vehicle speed, for example 30 m.p.h. (44 feet/second). If the vehicle tends to run at less than 30 m.p.h. the wave tends to run ahead of the vehicle whereby the supply voltage moves to the next higher step causing the vehicle to speed up until the region of the wave which is at $V_n$ volts is again reached. Similarly, if the vehicle tends to run at more than 30 m.p.h. it tends to run ahead of the wave whereby the supply voltage moves to the next lower step causing the vehicle to slow down until it reaches again the region of the travelling wave which is at the design voltage of $V_n$ volts.

Thus the vehicle moves at the same speed as the wave and is trapped in one cycle of the wave.

Cnsider now a vehicle which is fed onto the track at 30 m.p.h. but behind the first vehicle, i.e., for example, for the instant shown in FIG. 1 is fed in with its power pick-up brush at the section C. The voltage supplied to this vehicle is higher than the design voltage and will cause the vehicle to accelerate towards the first vehicle travelling at 30 m.p.h. As the second vehicle approaches the first the supply voltage fed to the second will be reduced until it nudges the first vehicle and they travel along in contact. Others can be fed in to enlarge the bunch until several vehicles are moving along at the same speed in end-to-end contact, the bunch being trapped in one cycle of the travelling wave.

The mean of the staircase waveform shown in FIG. 1 is a rectilinear ramp but to facilitate bunching even further the mean ramp can be made curvilinear as shown by the dotted line 11 in FIG. 1.

This is of particular value at junctions where it may be necessary to accelerate bunching in order to ensure adequate space into which another vehicle can be fed.

For example, referring to FIG. 2, this shows a travelling wave 10 (mean of the staircase) in which the nominal voltage $V_n$ occurs in the region of the point 12.

Between the lowermost end of the ramp and the end of each cycle is a guard region Y and the initial region X of the upper end of the ramp is the region into which an extra vehicle can be fed at a junction. For a short distance before the junction the waveform can te steepened over the region X as shown by the broken line 13 causing acceleration of any vehicle which may still be in the region X out of this region whereby space is provided for the additional vehicle to be fed onto the travelling bunch.

Referring now to FIG. 3, this shows the manner in which the travelling, staircase, control wave can be provided. In FIG. 3 fifteen sections of supply rail marked A-O are connected end-to-end through resistors and rectifiers such as 13 and 14 connected in series between sections A and B. At the instant shown a DC supply voltage is applied between the sections A and O with the section A more positive than the section O. Current flows therefore through all the resistors and rectifiers in series, the volts drop across the resistors determining the staircase potentials on the different sections.

In order to cause this staircase waveform to move at the required speed the DC supply voltage is recurrently switched to the next adjacent end sections to the right. Thus at an appropriate instant after that shown in FIG. 3 the supply voltage is disconnected from the sections A and O and is applied between B and A' and so on. It will be understood that at the instant shown in FIG. 3 the next adjacent cycle of the wave begins at A'. The function of the rectifiers 14 is to separate the adjacent cycles of the travelling control and supply wave.

Referring now to FIG. 4, this shows schematically an embodiment of the principles set out in relation to FIGS. 1 to 3. A railway track 15 carries a vehicle 16 moving in the direction of the arrow at 30 m.p.h. Alongside the track is a supply rail for a control wave, the supply rail being in sections as shown by the references A to O. Each section is 11 feet long giving a total length of 165 feet for one cycle of the control wave.

These fifteen sections are connected respectively to 15 supply wires 17—31 which are connected through 15 semi-conductor switches 32—46 to two supply terminals 47 and 48. The terminal 47 is at a relatively high positive potential and determines the maximum value of the staircase wave and the terminal 48 is at a relatively low positive potential and determines the minimum value of the staircase wave. A third, grounded, supply terminal 49 is connected to the rails of the track as shown.

A control unit 50 is connected to the semi-conductor switches as shown and merely applies switching pulses to the switches for connecting the terminals 47 and 48 to the appropriate ones of the wires 17–31 for producing the travelling wave. For example, at the instant shown the switches 32 and 46 are set to connect the terminals 47 and 48 to the sections A and O of the supply rail.

What is claimed is:

1. A transport system comprising means providing a controlling electric wave travelling along a vehicle track at a predetermined speed, a plurality of vehicles moving along said track, pick-up means on each said vehicle to pick up said wave, and driving means on each said vehicle connected to the pick-up means individual thereto, the driving means on all said vehicles being responsive to said controlling wave to tend to move said vehicles along said track in register with a predetermined phase-portion of said wave, the wave length of said wave being sufficiently long to allow a plurality of vehicles to move along said track bunched in end-to-end contact or proximity with one another near said predetermined phase portion of the same wave length of said wave.

2. A transport system as claimed in claim 1, and wherein each said vehicle is electrically driven.

3. A transport system as claimed in claim 2, and wherein the controlling wave also constitutes the power supply for said vehicles.

4. A transport system as claimed in claim 1, and wherein the controlling wave is of staircase waveform and a rail for carrying said wave is in sections, there being one step of the wave on a section at any instant.

5. A transport system as claimed in claim 4, and wherein at a junction of two tracks said controlling wave has a part of steeper gradient to accelerate a joining vehicle into said bunch.

6. A transport system as claimed in claim 4, and wherein the controlling wave is an electric voltage wave.

7. A transport system as claimed in claim 6, and wherein said wave is applied to said rail sections by applying the maximum voltage of said wave to one segment per wave length in advancing sequence, and wherein adjacent sections of said rail sections are connected by one-way acting link elements operating to communicate power to the next rail section in the forward direction at a reduced power level and to block transfer of power in the rearward direction.

* * * * *